(12) United States Patent
Lees et al.

(10) Patent No.: US 12,734,755 B2
(45) Date of Patent: Sep. 15, 2026

(54) METHOD OF MONITORING AND INFLUENCING AN ADDITIVE LAYER MANUFACTURING PROCESS

(71) Applicant: WAYLAND ADDITIVE LIMITED, Huddersfield (GB)

(72) Inventors: Andrew Thomas Lees, Tadcaster (GB); Harry Kenneth Shuttleworth, Huddersfield (GB)

(73) Assignee: WAYLAND ADDITIVE LIMITED, Huddersfield (GB)

( * ) Notice: Subject to any disclaimer, the term of this patent is extended or adjusted under 35 U.S.C. 154(b) by 410 days.

(21) Appl. No.: 18/278,914

(22) PCT Filed: Feb. 11, 2022

(86) PCT No.: PCT/GB2022/000018
§ 371 (c)(1),
(2) Date: Aug. 25, 2023

(87) PCT Pub. No.: WO2022/180348
PCT Pub. Date: Sep. 1, 2022

(65) Prior Publication Data

US 2024/0131790 A1 Apr. 25, 2024
US 2024/0227295 A9 Jul. 11, 2024

(30) Foreign Application Priority Data

Feb. 26, 2021 (GB) ..................................... 2102804

(51) Int. Cl.
*B29C 64/321* (2017.01)
*B33Y 50/02* (2015.01)
(Continued)

(52) U.S. Cl.
CPC ............ *B29C 64/321* (2017.08); *B33Y 50/02* (2014.12); *B29C 64/153* (2017.08); *B33Y 30/00* (2014.12)

(58) Field of Classification Search
CPC ... B29C 64/321; B29C 64/153; B29C 64/343; B29C 64/357; B29C 64/386;
(Continued)

(56) References Cited

U.S. PATENT DOCUMENTS 10,406,599 B2 9/2019 Ljungblad et al.
2004/0173946 A1 9/2004 Pfeifer et al.
(Continued)

FOREIGN PATENT DOCUMENTS

GB 2559579 A 8/2018
WO 2015/120047 8/2015
WO 2018/183396 A1 10/2018

OTHER PUBLICATIONS

International Preliminary Report on Patentability received for PCT Patent Application No. PCT/GB2022/000018, mailed on Sep. 7, 2023, 9 pages.

(Continued)

*Primary Examiner* — Yuhui R Pan
(74) *Attorney, Agent, or Firm* — Shook, Hardy & Bacon L.L.P.

(57) ABSTRACT

A method of monitoring and influencing an additive layer manufacturing process, in which selective fusing of powder material in successively applied layers is carried out to manufacture a three-dimensional article, comprises delivery to a work space, for example in a vacuum chamber (12) of electron beam additive layer manufacturing apparatus (10), of a quantity of the powder material in excess of that required to form a layer of a given volume in a build zone of the space and spreading the powder material within the
(Continued)

work space by a spreader (17) to form the layer in the build zone and also an accumulation of excess powder material in an accumulation zone adjoining the build zone. Spreading is repeated to form successive such layers and accumulations and the volume of each accumulation is determined by imaging, along an optical path (B), of a structured light pattern which has been projected along an optical path (A), onto the respective accumulation from an imaging direction different from the projection direction so as to result in distortion of the pattern by the accumulation. The imaged pattern is then able to be evaluated to derive the volume of the accumulation from the distortion and the determined volumes of the accumulations are utilised to influence the additive layer manufacturing process.

13 Claims, 2 Drawing Sheets

(51) Int. Cl.
*B29C 64/153* (2017.01)
*B33Y 30/00* (2015.01)

(58) Field of Classification Search
CPC ....... B29C 64/393; B33Y 50/02; B33Y 30/00; B33Y 10/00; B33Y 50/00; Y02P 10/25; B22F 10/31; B22F 10/37; B22F 10/85; B22F 12/90; B22F 10/28; B22F 10/30; B22F 10/70; B22F 10/73
See application file for complete search history.

(56) References Cited

U.S. PATENT DOCUMENTS

2021/0291457 A1* 9/2021 Jowkar ................ B29C 64/205
2022/0252392 A1* 8/2022 Goodwin .............. B33Y 10/00

OTHER PUBLICATIONS

International Search Report Mailed Jun. 10, 2022 in International Application PCT/GB2022/000018 filed Feb. 11, 2022.
United Kingdom Search Report, Searched on Aug. 24, 2021 for GB2102804.8 filed on Feb. 26, 2021.

* cited by examiner

METHOD OF MONITORING AND INFLUENCING AN ADDITIVE LAYER MANUFACTURING PROCESS

CROSS-REFERENCE TO RELATED APPLICATIONS

This application claims priority under 35 U.S.C. § 365 to International Application No. PCT/GB2022/000018, filed Feb. 11, 2022, entitled "Method of Monitoring and Influencing an Additive Layer Manufacturing Process," and to United Kingdom Patent Application No. 21 02 804.8, filed Feb. 26, 2021, entitled "Method of Monitoring and Influencing an Additive Layer Manufacturing Process." The entirety of the aforementioned applications are incorporated herein by reference.

The present invention relates to a method of monitoring and influencing an additive layer manufacturing process, especially monitoring consumption of powder material used in the process.

Additive layer manufacturing is a well-established procedure for manufacture of three-dimensional articles. In this procedure, an article is produced by selectively melting fusible powder material by irradiation with an energy beam, such as an electron or laser beam. Irradiation and fusion are carried out in relation to successively formed layers of the powder material so that material in each layer is melted in accordance with a predefined pattern and fused not only to itself, but also to any previously fused material of an underlying layer, whereby the article shape is created on a layer-by-layer or an additive basis. A key element of equipment for performing this procedure is a powder material feed and distribution system, which typically comprises a supply of powder material, a spreader for spreading successive layers of powder material in a construction space and a mechanism for lowering the construction space after the spreading of each layer and the selective fusion of its constituent powder material. For product quality reasons it is important that the powder material forming each layer is evenly distributed over the area of the construction space and that the layer thickness is well-defined and corresponds with a predetermined value. In addition, it is desirable for each layer to be applied quickly so as to keep the manufacturing rate as high as possible.

In order to ensure an even spread of powder material across each layer it is usually necessary to present to the spreader more material than will be consumed by an individual layer. However, powder feedstock is usually expensive, for which reason it is highly desirable to reuse any available excess powder from each layer. A consequence of operation with an excess of powder material is that the excess tends to be present in a variable amount as manufacture of an article proceeds, which in turn can represent a variable in the course of an article production cycle and in that case detract from precise control and management of the manufacturing process.

In a known procedure for measurement of powder material as described in U.S. Pat. No. 10,406,599 B2, images of the shape of a portion or several portions of a heap of powder material, which is yet to be distributed, i.e. spread to contribute to layer formation, in front of a spreader of additive layer manufacturing apparatus are captured and one or more dimensions of the portion are derived from the image or images and compared with desired parameter values relating to powder material quantity. The comparison results are employed to assist in achieving even powder material distribution, including varying the quantity of supplied material. The described procedure is capable of identifying the existence of an excess of powder material after distribution, but does specifically determine the amount of such an excess and does not disclose a measurement method capable of making such a determination.

It is accordingly a principal object of the invention to make it possible to monitor and influence an additive layer manufacturing process, in particular a process in which amounts of powder material in excess of layer requirements arise, so that a variable which detrimentally affects process management can be eliminated or at least reduced in importance and thus a more precise conduct of the process carried out.

A supplementary object is to enable monitoring, by a simple, but effective procedure, in such a way that data concerning powder material consumption during layer formation can be obtained and can be used to regulate powder material supply and replenishing so as to achieve benefits in the economy of the process, particularly the utilisation of the powder material.

Other objects and advantages of the invention will be apparent from the following description.

According to the present invention there is provided a method of monitoring and influencing an additive layer manufacturing process in which selective fusing of powder material in successively applied layers is carried out to manufacture a three-dimensional article, the method comprising the steps of: delivering to a work space a quantity of the powder material in excess of that required to form a layer of a given volume in a build zone of the space, spreading the powder material within the work space to form the layer in the build zone and to additionally form an accumulation of excess powder material in an accumulation zone adjoining the build zone, repeating the step of spreading to form successive such layers and accumulations, determining an at least approximate volume of each accumulation by imaging of a structured light pattern which has been projected onto the respective accumulation, the imaging being from a direction different from a direction of the projection so that distortion of the projected pattern by the accumulation is produced in the imaged pattern, and by evaluating the imaged pattern to derive from the pattern distortion the at least approximate volume of the accumulation responsible for the distortion, and influencing the additive layer manufacturing process in dependence on the determined volumes of the accumulations.

The formation of each layer of powder material on the basis of an excess of material needed for the layer and a resultant deposit of the excess in a dedicated accumulation zone creates a precondition for layer formation with a desired consistent thickness, in particular by reduced risk of voids, layer thinning or other depletions, and for reuse of available excess material to contribute to formation of at least one succeeding layer. Powder material reuse or recycling in this way may allow an accelerated rate of production and reduce wastage of material. In circumstances such as these it is of substantial advantage to be able to monitor an article manufacturing cycle with knowledge of the approximate or actual volume of each such accumulation of excess powder material, which represents a parameter of powder material consumption by individual layers and through knowledge of which it becomes possible to influence, inter alia, different aspects of ongoing layer formation. The use of a structured light pattern which is projected and imaged in such a way that a target powder material accumulation produces a distortion of the pattern in the pattern image, the pattern distortion in the image then being analysed, provides a simple contactless means of achieving volumetric measurement of a shape, particularly height and base area, that is otherwise difficult to accurately accomplish. The approximate volume of each accumulation can be mathematically determined without difficulty from the direction and extent of distortion of the structured light pattern in conjunction with known parameters such as the direction of light projection.

For preference, the step of influencing is carried out in relation to powder material used or for use in the additive layer manufacturing process, which allows correlation of the volume measurement with a directly relevant aspect of the manufacturing process. In that case, the step of influencing can comprise influencing at least one of delivery of powder material to and spreading of powder material in the work space. If the influencing is applied to powder material delivery, the supply of material for layer formation can be set or adjusted with account taken of the volumes of the individual accumulations of excess material. If the influencing is applied to spreading of power material, the parameters of spreading can be similarly set or adjusted on the basis of the volume measurements. Consequently, in a preferred example of the method the step of influencing comprises adjusting a parameter of powder layer formation in the build zone, so that the additive layer manufacturing process as applied to each article can be conducted layer-by-layer with regulation based on knowledge of the volume of excess material left after each formed layer. In the case of a process with an essentially passive system of self-regulation of powder material dispensing, the monitoring afforded by the method may allow, for example, recognition of change in the system and consequent influencing in the sense of tuning the system in the course of a single article build or multiple article builds, in particular to correct for long-term drift. The parameter can be, for example, a rate of powder material distribution to form a layer, the point or time at which the spreader terminates spreading to form a layer or another factor influencing layer formation.

In a more direct or dynamic utilisation of the volume measurement the method comprises the step of comparing the determined at least approximate volume of each accumulation with the given volume of the layer to obtain a measurement of powder material consumption by each layer, the additive layer manufacturing process then being influenced as a function of the obtained measurements of powder material consumption. This provides scope for accurate control of the ongoing manufacturing process on the basis of powder material consumption by each layer, such consumption being determined not by a direct measurement of the volume of each layer, but by a simpler indirect measurement related to leftover powder material from each layer. A determined volume of the leftover material, that is to say an accumulation of excess material, can be simply correlated with a volumetric computation, for example on a weight basis, of the material supplied to form a layer so as to obtain data relating to the actual volume of material in the layer once formed.

Consequently, in such a dynamic procedure, in which the manufacturing process includes delivery to the work space of further powder material for use in formation of the successive layers, the step of influencing may comprise regulating the delivery as a function of the obtained measurements of powder material consumption. In that case, the manufacturing process can be conducted on the basis of, especially, periodic resupply of powder material with account taken of actual and ongoing requirements of material for the layers rather than estimates made before the process. This dynamic procedure is particularly advantageous with respect to a possible need for adaptations during the cycle of manufacture of an article, for example if powder material with different characteristics such as particle size, weight, flowability, etc., is introduced in the course of a cycle. Regulation of delivery can be take various forms, for example with respect to timing of the delivery and/or with respect to the amount of further powder material in the delivery. Both forms of regulation, whether undertaken as alternatives or as a combination, provide scope for very precise influencing of the manufacturing process. Accordingly, with advantage the method comprises determining from the measurements of powder material consumption supplementary amounts of powder material needed to form further such layers, in which case the determined supplementary amounts of powder material preferably also include those needed to form further such accumulations.

Although the method of monitoring an additive layer manufacturing process can be performed as an entirely stand-alone procedure in the context of the process, economy of operation may be enhanced if, in conjunction with the performance of the steps of the method the structured light pattern is projected simultaneously onto both a surface of a formed layer of the powder material and an adjoining accumulation of excess powder material left after formation of that layer, an image is produced of the pattern on both the layer surface and the accumulation and the pattern distortion in the image is evaluated to not only determine the volume of the accumulation of excess powder, but also to identify defects in the layer surface. Projection of the structured light pattern onto and imaging of the resulting distorted pattern from the accumulation can thus be utilised in simultaneous procedures for two different tasks, thus fault detection at the layer surface and volumetric measurement of the accumulation, the obtained images being subjected to different processing and analysis to yield the different desired results. Although separate projection and imaging equipment can used for the two tasks, with advantage the pattern is projected onto the layer surface and the accumulation by a common projecting system and the projected pattern on the layer surface and the accumulation is imaged by a common imaging system.

A method of this kind is particularly appropriate for performance by additive layer manufacturing apparatus having a raisable and lowerable support for a material bed formed from successively deposited layers of the powder material, the support having an area representing a build zone into which energy is introducible to selectively melt and fuse layer material. A spreader is movable across the support to spread powder material in the build zone for formation of successive layers of defined depth and to guide excess powder material from each layer into an accumulation zone adjacent to the build zone. The support can be lowered to allow movement of the spreader over the accumulation zone without colliding with excess powder material collected therein and subsequently raised to allow reciprocal movement of the spreader over the accumulation zone and return of the excess powder material to the build zone by the spreader, thus recirculation of the excess powder material. The area of the accumulation zone can be of sufficient size to allow collection of enough excess powder material for formation therefrom of a layer of a given area and the given defined depth in the course of the return of the excess powder material to the build zone, thus an accumulation zone area of such a size that the zone can accommodate a volume of excess powder material greater than the product of the two-dimensional area of the build zone and the depth predetermined for each layer. The layer depth in additive layer manufacture is usually about 20 to 100 microns, in which case the area for the accumulation zone does not have to be particularly large in order for the required volume to be accepted. The accumulation of returnable excess powder material can thus be sufficient for formation of an entire layer, potentially even several layers, but even just part of a layer is conceivable. In the last-mentioned case, topping up of powder material can be carried out before or during formation of a layer.

A preferred example of a method according to the present invention will now be more particularly described, in conjunction with apparatus in which the method can be performed, with reference to the accompanying drawings, in which.

Figure 1:
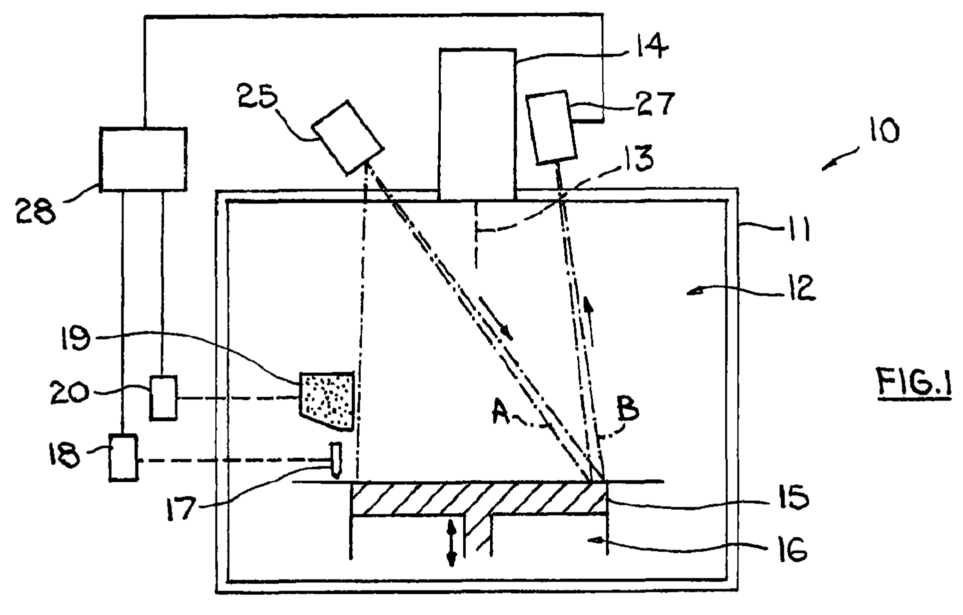
FIG. 1 is a diagrammatic elevation of additive layer manufacturing apparatus in which a method exemplifying the present invention can be performed.

Referring now to the drawings there is shown in FIG. 1, in highly diagrammatic form, additive layer manufacturing apparatus 10 for manufacturing three-dimensional articles of predefinable shapes by selective melting and fusion of powder material, particularly a metallic material, in successively deposited layers in a build zone, the configuration of the apparatus being such that a method exemplifying the present invention can be performed by the apparatus in the course of an article manufacturing process. In the case of the apparatus 10, melting is by way of the action of an electron beam, although energy could also be provided by, for example, a laser or other suitable energy source. The powder material could also be a plastics or other meltable material. The environment for operation with an electron beam is provided by a housing 11 bounding a vacuum chamber 12 in which a vacuum, as a precondition for propagation of an electron beam 13, can be established. The beam 13 is generated by an electron gun 14 located at the top of the housing 11 and oriented to direct the generated beam downwardly along a vertical neutral axis towards a target region. The beam 13 can be deflected relative to the axis by, for example, an electromagnetically operating deflector (not shown) in X and Y directions as exemplified by the dashed line arrows for opposite end of the range of deflection in the X directions in FIG. 2D. Appropriately controlled beam deflection allows movement of the point of incidence of the beam on a target to cover an area of predetermined shape corresponding with an individual cross-sectional layer of an article undergoing manufacture.

Provided in the vacuum chamber 12 at a spacing below the electron gun 14 and in the target region of the generated beam is a raisable and lowerable support 15, thus a support movable in Z directions as indicated in FIG. 1 by an associated double arrow and in FIGS. 2C and 2D by individual arrows, for a bed formed from the successively deposited layers of the powder material. The support 15 has the form of a table which is mounted on a post or posts and guided for vertical movement in a shaft 16, the walls of which generally confine the material bed, when present, to the table. Above the walls, the table is surrounded by a surround with a planar surface with which the top of the table or top of a material bed on the table is generally alignable to lie in a common plane. The movement of the support 15 is provided by a drive (not shown), which and can be a piston-cylinder unit, spindle drive, rack-and-pinion drive, linear motor or any other suitable means of imparting periodic reciprocating linear movement.

The cycle of movement of the support 15 in the context of additive layer manufacture in a conventional procedure commences with positioning the top of the table below the plane of the surface of the surround to the extent of a defined depth or thickness of a layer of the powder material, spreading powder material on the table to form a layer with its top surface generally in the plane of the surface of the surround and selectively melting and thereby fusing powder material in the layer. Thereafter, the procedure continues by lowering the support 15 to the extent of the defined layer depth in readiness for formation of another such layer, spreading powder material on the table to form the next layer also with a top surface thereof in the plane of the surface of the surround and selectively melting powder material in that layer to fuse the material not only together in that layer, but also to the already-fused material of the layer thereunder. This procedure is repeated so that the selective melting of successive layers of powder material by scanning of the material bed by the electron beam 13 forms, in conjunction with incremental descent of the support 15, successive cross-sectional layers of an article of desired shape in X, Y and Z directions.

Figure 2A:
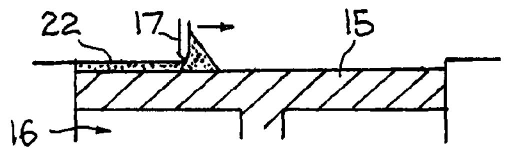
FIGS. 2A-2E are diagrams showing a sequence of steps in additive layer manufacture of an article by the apparatus.

Spreading of the powder material to form each layer is by way of a spreader 17 which is movable over the support 15 to smoothly distribute powder material to be substantially level with the plane of the surface of the surround. Movement of the spreader 17 for reciprocating travel in X directions, as indicated in FIGS. 2A and 2E by associated arrows, over the support is provided by a drive (not shown), which is controlled by a control unit 18 and which can be, for example, a cogged belt and pinion drive, spindle drive, rack-and-pinion drive, linear motor or any other suitable means of imparting periodic reciprocating linear movement. The control unit 18 is represented only symbolically as a separate unit and in practice may be an integrated part of an overall or superordinate control system of the apparatus, for example a system in which appropriate commands are issued by software responsible for controlling operation of the apparatus to execute manufacturing cycles. Spreaders of such a kind are used in various forms of construction in prior art apparatus.

The powder material for the layers forming the powder material bed is supplied by a feeder or dispenser 19 suitably positioned in relation to the support 15, for example on one side of the table 15 of the support. Dispensers are also known in a variety of forms in the prior art and can comprise, for example, a hopper containing a charge of powder material sufficient for manufacture of an individual article or given number of articles. The spreader 18 itself may be equipped with a dispenser and fed from such a hopper or periodically from a powder reserve outside the housing 11. Supply of powder material from the dispenser 19 is carried out under the control of a control unit 20 which determines the amount of powder material supplied for spreading and the times of supply. In similar manner to the control unit 18, the control unit 20 is represented symbolically as a separate unit and again may be an integrated part of an overall control system.

The movements of the support 15 and spreader 17 in course of a manufacturing cycle, that is to say creation of an individual cross-sectional layer of an article, are correlated as will be evident from the foregoing and as is explained below with reference to FIGS. 2A to 2E. Specifically, the drive of the support and the drive of the spreader are controlled to move the support and spreader at specific times and in specific directions during each cycle, such control being provided by control means symbolically represented by the control units 18 and 20.

A feature of the apparatus, as indicated in the introduction, is operation to spread more powder material in the course of creation of each layer than actually required by that layer, thus a volume of supplied powder material greater than the volume of the layer. The intentional over-supply of powder material ensures formation by the spreader 17 of a layer which is as free as possible of voids, depressions or other faults attributable to a deficiency of powder. The over-supply results in creation of an excess of powder material at the conclusion of formation of each layer and consequently, especially for reasons of economy, a need to return the excess for reuse. This return is achieved by spreading the excess powder over a just-formed layer, after it has been subjected to the thermal action of the electron beam, by way of a return movement of the spreader 17 to form part or all of a further layer. Powder recirculation can be achieved by various methods, including manipulation of the spreader to pass from one side of an accumulation of excess powder to the other. Another possibility, which is employed in the apparatus 10 described and illustrated herein, is realised by confining excess powder material to the support 15 and providing powder return by correlated movements of the support 15 and spreader 17 as discussed below in connection with FIGS. 2A to 2E.

In order to confine excess powder material to the support 15, the support defines not only an area for a build zone in which article manufacture is carried out by electron beam action, but also a directly adjacent, in particular contiguous, area for an excess powder material accumulation zone in which excess powder material from each powder material layer is collected and forms an accumulation. For that purpose, the top of the table of the support is notionally divided into two areas forming the bases of two volumes of variable height. These volumes are defined by projections of the two areas normal to the plane of the top of the table and respectively represent the build zone and the accumulation zone. These zones migrate upwardly relative to the support 15 as it is progressively lowered in the course of formation of the powder material bed and as the bed progressively increases in height. Thus, the zones at the outset of manufacture directly overlie the top of the table and thereafter overlie each preceding layer at the top of the material bed. With respect to the total area of the top of the table, the major part is occupied by the area associated with the build zone and a relatively small strip-shaped region is reserved as the area associated with the excess powder material accumulation zone. The latter area runs along a boundary of the table and has the form of a strip extending transversely to the directions of reciprocating movement of the spreader 17 indicated by the associated arrows in FIGS. 2A and 2E, thus a strip running along a Y axis.

The range of action of the electron beam 13 is specifically limited to the build zone. Limitation of the range of beam action is provided simply by control of the range of beam deflection allowed by the above-mentioned beam deflector.

The sequence of actions involved in formation of each layer of powder material and recirculation of excess material is described in the following in conjunction with FIGS. 2A to 2E, each of which diagrammatically depicts, in sectional view, the support 15 composed of table and post, the shaft 16 with part of the surround, and the spreader 17. Each figure shows a stage in manufacture of an article 21 surrounded by partly melted or unmelted powder material and supported on top of the table. The manufacture of the article by powder material melting and fusion is carried out in the build zone up to a small spacing from the surround so that there is no risk of adhesion of the article to the material of the surround, in particular the walls of the shaft 16. It should be noted that, apart from the highly schematic nature of FIGS. 2A to 2E the powder material layer depth and an accumulation of excess powder material are illustrated in greatly exaggerated size to assist understanding.

In FIG. 2A the components referred to in the preceding paragraph are shown in a state in which the support 15 is positioned in the shaft 16 so that the top of the table lies below the plane of the surface of the surround by an amount preferably equal to a predetermined depth of a layer of powder material to be formed, for example a depth of 0.07 millimetres. In the described and illustrated position of the support the spreader 17—here moving to the right—smoothly and evenly spreads supplied powder material from the dispenser 19 over the table so as to form a first layer 22 which is substantially flush with the surface of the surround and consequently of the desired depth. FIG. 2A shows the layer 22 in partly formed state. Powder material which is entrained by the spreader 17 and has not yet been spread is present as a heap of diminishing size in front of the spreader in the direction of travel to the right.

Figure 2B:
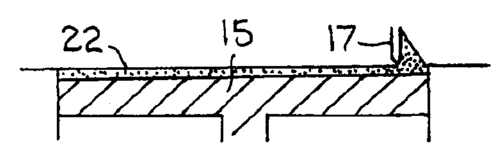

FIG. 2B shows final formation of the first layer 22, which now fully covers the top of the table in the build zone. An important aspect of layer formation from the viewpoint of achieving a consistent layer depth and a planar surface is, as already mentioned, supply of powder material in excess of the amount actually needed for formation of each layer. The excess powder, which can be, for example, an amount sufficient for formation of part of a next layer, the entire next layer or several succeeding layers, is guided by the spreader 17 into the accumulation zone.

Figure 2C:
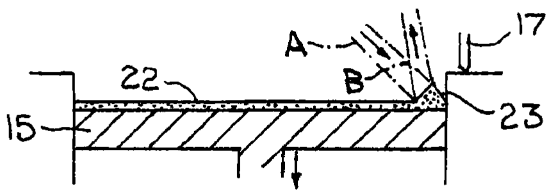

Thereafter, as shown in FIG. 2C, the support 15 is lowered under the control of the control unit 18 until the collected excess powder material is free of the spreader and lies a clear distance below the plane of the surface of the surround, during which the excess material—which is no longer confined on the left by the spreader 17, but is confined on the right by a wall of the shaft 16—redistributes under gravity over a greater base area, but still within the accumulation zone, to form a generally ridge-shaped accumulation 23. In the case of an accumulation zone of 300 millimetre width in Y direction, the accumulation is typically 3 millimetres high and has a base dimension of 17 millimetres in X direction. Under the control of the control unit 18 the spreader 17 is now moved further to the right beyond the accumulation zone without colliding with the accumulation 23, until the spreader is positioned above the surround.

Figure 2D:
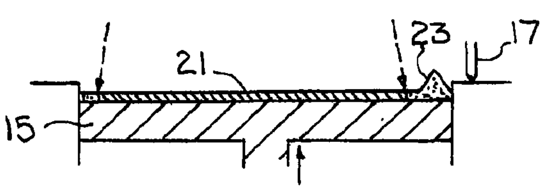
Figure 2E:
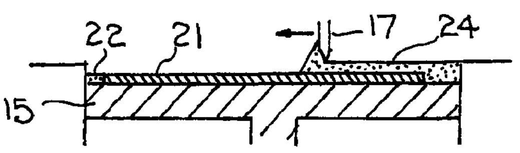

In this phase with fully formed layer 22 in the build zone and the support 16 preferably raised as shown in FIG. 2D, the electron gun 14 is energised to emit the electron beam 13 in the direction of the layer 22. The emitted beam is deflected, as indicated by the dashed arrows in FIG. 2D denoting a maximum range of deflection, to scan a predetermined area of the layer to be melted, which is an area depending on predefined features of shape of the article, so as to fuse powder of the layer together and thereby form a first cross-section of the article 21.

In a next step and as shown in FIG. 2E, with the support 15 positioned so that the top of the newly created cross-section of the article 21 and of the residual powder of the first layer 22 lie below the plane of the surface of the surround again by the amount of the predetermined depth of a powder material layer, the spreader 17 is now moved in the opposite direction, thus to the left, to entrain the accumulation 23 of excess powder material and spread the material to form part or all of a next (second) layer 24. The cycle of steps described with reference to FIGS. 2A to 2E is repeated, except that all succeeding layers are always spread in part over the top of the partly manufactured article and outlying residual powder in the build zone until the article achieves its predefined shape and is fully manufactured. During these cycles, thus the additive layer manufacturing process, the action of the electron beam 13 not only fuses together the targeted powder material of the uppermost layer, but also fuses that material to the underlying already-fused material.

The mentioned exemplifying dimensions of the layer thickness and the volume of the accumulation 23 of excess powder material after formation of a layer can be sufficient, in the case of a layer area of, for example, about 300 millimetres width in each of the X and Y axes, for formation of more than one succeeding layer. However, the actual volume of the accumulation of excess powder material left after each formation of a layer usually varies. Knowledge of the volume is one of a number of parameters useful to monitoring the progress and to regulation of the additive layer manufacturing process and accordingly the apparatus 10 is equipped to enable determination of the volume of each accumulation by a simple, contactless procedure, thus is equipped to perform a method exemplifying the present invention.

For that purpose the apparatus incorporates a non-contact measurement system comprising, firstly, an optical projector 25 for projecting structured light on an optical projection path A, as indicated in FIGS. 1 and 2C by chain-dotted lines, through the vacuum chamber 12 via a window (not illustrated) to define a fringe pattern on a confronting face of each accumulation 23 of excess powder material in the accumulation zone. The pattern is formed over the entire length of the accumulation 23 transversely or crosswise to the directions of reciprocating movement of the spreader 17. Structured light defining a fringe pattern can optionally also be projected on a larger optical path (delimited on the lefthand side by a further chain-dotted line in FIG. 1) in the build zone on each formed powder material layer 22, 24. Projection is carried out before beam action on the layer for melting constituent powder material or after such beam action, but in any event before return of the spreader 17 to spread the material making up the accumulation. The fringe pattern, which is generated by computer software, can take various forms, but expediently consists of an array of regularly spaced stripes 26 of contrasting tone (fringes), an example of part of such a projected fringe pattern being shown in FIGS. 3A to 3C as discussed further below.

Figure 3A:
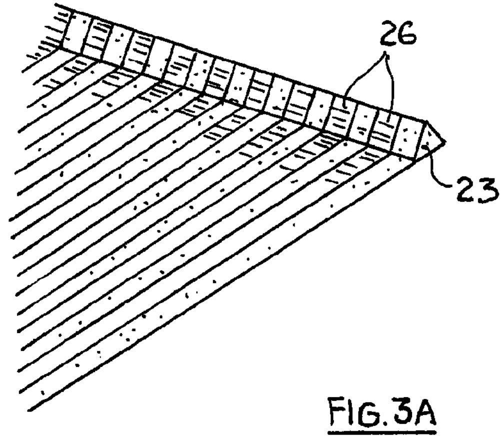
FIGS. 3A-C are diagrams showing variations of an aspect of the method exemplifying the invention.
Figure 3B:
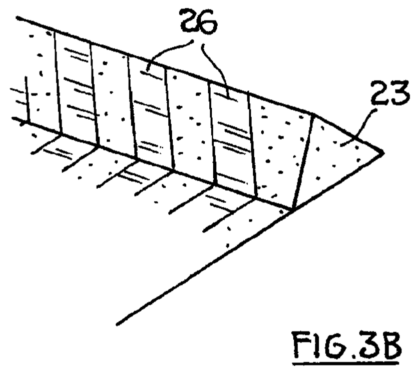
Figure 3C:
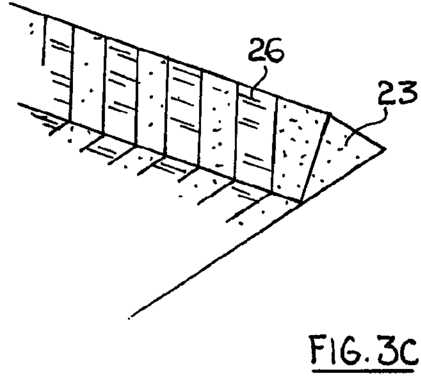

The measurement system also comprises, secondly, an optical imaging camera 27 for imaging the projected fringe pattern on an optical imaging path B through the vacuum chamber 12 via a further window (also not illustrated), the imaged pattern being shown in FIG. 3B with, by comparison with FIG. 3A, an obliquity signifying the angle of the optical imaging path B relative to the optical projection path A. Similarly to the projection, the imaging covers the entire length of the accumulation 23 transversely to the directions of reciprocating spreader movement. Since the imaging is undertaken from a perspective different from that of the projection, as represented by the relatively angled optical paths A and B, a topographical feature in the form of an elevation such as the ridge-shaped accumulation 23 of excess powder produces a distortion of the individual stripes 26 of the imaged fringe pattern. The magnitude and vector of the distortion are dependent on the slope and height of the face of the accumulation onto which the fringe pattern has been projected and these in turn are a function of the geometric cross-sectional form of the accumulation, which in conjunction with the length of the accumulation, i.e. measured dimension of the layer and associated accumulation along the Y axis, represents the volume of the accumulation. FIG. 3A shows a small part of the projected fringe pattern on the target face of the accumulation, with optional additional overlay of the top surface of the associated powder material layer. The fringe pattern stripes, which run the entire length of the accumulation 23, are shown with exaggerated width and spacing. In reality, the stripes are so narrow and with such a small spacing that they are densely packed over the length of the accumulation 23 so as to enable, when imaged and analysed, construction of a cross-sectional surface map of the accumulation, i.e. height of the accumulation at every X and Y location of the accumulation zone. FIGS. 3B and 3C show different distortions, in greatly exaggerated scale, of the imaged fringe pattern stripes 26 as a consequence of different slopes of the target face of the accumulation 23 and thus different volumes of the accumulation. The imaged distortions are subject to processing and analysis, with use of an appropriate algorithm, in a processing unit 27 which is connected with the imaging camera 27 to receive digital data representing the imaged distortions and which processes the input data to produce an output for use in influencing the manufacturing process. The output, which represents successive volumetric measurements of successive accumulations 23, can be employed in a passive sense such as in monitoring the additive layer manufacturing process to provide a basis for correction for drift, adjustment for change in powder material characteristics or other variables or in a dynamic sense such as in periodic or regular adjustment of parameters of powder material supply to the build zone, for example in the calculation of top-up quantities of powder material to increase the amount of material forming an accumulation to be spread by the spreader 17, adjustment of powder material amounts to be supplied for formation of layers by reciprocal movement of the spreader, the speed of movement of the spreader and other factors. FIG. 1 shows, merely by way of example, connection of outputs of the processing unit 28 with the spreader control unit 18 and the dispenser control unit 20 to demonstrate possibilities of direct dynamic influencing of critical aspects of the additive layer manufacturing process.

The positions of the projector 25 and camera 27 are shown in FIG. 1 in purely arbitrary locations, having regard to the two-dimensional nature of the drawing, to make clear the different orientations of the optical projection path A and optical imaging path B. The projector and camera could be positioned to, for example, overlap the electron gun 14 in a projection at right angles to the plane of the drawing. The positioning is a known factor in each case and compensation for any influence on the obtained images can be undertaken in the course of processing by the processing unit 28.

As already mentioned, the fringe pattern embodied in the structured light projection can additionally be projected onto and imaged from an entire layer, in which case topographical features such as elevations and depressions manifest themselves as disturbances in or distortions of the individual strips of the pattern. Elevations may be formed by the crests of undulations in the layer, agglomerations of particles of powder material, displacements caused by protrusions from an underlying layer and other such faults, and depressions may be formed by the valleys of such undulations, voids, areas of missing powder, scores due to particle drag or damage by the spreader and other issues. Recognition of defects of these kinds can be achieved by analysis of each imaged fringe pattern from a layer by suitable analysis techniques to produce data characterising faults in the powder material layer, on the basis of which appropriate corrective action can be determined. Action of that kind can concern, inter alia, parameters of powder supply, spreading and beam operation. If fault determination is carried out by way of structured light projection and imaging, use can be made of a single optical projection and imaging system, in particular with use of the same projector 25 and camera 27 employed for the volumetric measurement of the accumulations of excess powder material.

The invention claimed is:

1. A method of monitoring and influencing an additive layer manufacturing process in which selective fusing of powder material in successively applied layers is carried out to manufacture a three-dimensional article, the method comprising:

delivering to a work space a quantity of the powder material in excess of that required to form a layer of a given volume in a build zone of the work space;

spreading the powder material within the work space to form the layer in the build zone and to additionally form a ridge-shaped accumulation of excess powder material in an accumulation zone adjoining the build zone;

repeating the step of spreading to form successive such layers and accumulations;

determining an at least approximate volume of each accumulation by imaging of a structured light pattern which has been projected onto a confronting face of the respective ridge-shaped accumulation, the imaging being from a direction different from a direction of the projection so that distortion of the projected pattern by the accumulation is produced in the imaged pattern, and by evaluating the imaged pattern to derive from the pattern distortion the at least approximate volume of the accumulation responsible for the distortion; and influencing the additive layer manufacturing process in dependence on the determined volumes of the accumulations.

2. The method according to claim 1, wherein the step of influencing is carried out in relation to powder material used or for use in the additive layer manufacturing process.

3. The method according to claim 2, wherein the step of influencing comprises influencing at least one of delivery of powder material to and spreading of powder material in the work space.

4. The method according to claim 3, wherein the step of influencing comprises adjusting a parameter of powder layer formation in the build zone.

5. The method according to claim 4, wherein the parameter is a rate of powder material distribution to form the layer.

6. The method according to claim 1, comprising the step of comparing the determined at least approximate volume of each accumulation with the given volume of the layer to obtain a measurement of powder material consumption by each layer, wherein the additive layer manufacturing process is influenced as a function of the obtained measurements of powder material consumption.

7. The method according to claim 6, wherein the manufacturing process includes delivering to the work space further powder material for use in formation of the successive layers and the step of influencing comprising regulating the delivery as a function of the obtained measurements of powder material consumption.

8. The method according to claim 7, wherein the delivery of further powder material is regulated with respect to timing of the delivery.

9. The method according to claim 7, wherein the delivery of further powder material is regulated with respect to the amount of further powder material in the delivery.

10. The method according to claim 9, comprising determining from the measurements of powder material consumption supplementary amounts of powder material needed to form further such layers.

11. The method according to claim 10, wherein the determined supplementary amounts of powder material are also those needed to form further such accumulations.

12. The method according to claim 1, wherein the structured light pattern is projected simultaneously onto both a surface of a formed layer of the powder material and an adjoining accumulation of excess powder material left after formation of that layer, an image is produced of the pattern on both the layer surface and the accumulation and the pattern distortion in the image is evaluated to not only determine the volume of the accumulation of excess powder, but also to identify defects in the layer surface.

13. The method according to claim 12, wherein the pattern is projected onto the layer surface and the accumulation by a common projecting system and the projected pattern on the layer surface and the accumulation is imaged by a common imaging system.

* * * * *